(12) United States Patent
Kalinowski et al.

(10) Patent No.: US 8,641,809 B2
(45) Date of Patent: Feb. 4, 2014

(54) ROTOR SUPPORT SYSTEM

(75) Inventors: Benjamin J. Kalinowski, Newton, NH (US); Gregoire N. Gosselin, Kingston, NH (US)

(73) Assignee: Munters Corporation, Amesbury, MA (US)

( * ) Notice: Subject to any disclaimer, the term of this patent is extended or adjusted under 35 U.S.C. 154(b) by 650 days.

(21) Appl. No.: 12/926,101

(22) Filed: Oct. 26, 2010

(65) Prior Publication Data

US 2012/0100007 A1    Apr. 26, 2012

(51) Int. Cl.
*B01D 53/02* (2006.01)
(52) U.S. Cl.
USPC ............... 96/151; 96/138; 96/125; 95/113
(58) Field of Classification Search
USPC .......... 248/214; 96/151, 138, 125; 165/54, 8; 95/113; 29/732, 760; 55/508
See application file for complete search history.

(56) References Cited

U.S. PATENT DOCUMENTS

| | | | |
|---|---|---|---|
| 3,090,237 A | | 5/1963 | Ongaro |
| 3,136,162 A | | 6/1964 | White |
| 3,572,620 A | | 3/1971 | Kincaid et al. |
| 3,726,046 A | | 4/1973 | Dreher |
| 4,164,338 A | | 8/1979 | Myron |
| 4,450,373 A | | 5/1984 | Miller et al. |
| 4,635,336 A | | 1/1987 | Ades et al. |
| 5,241,905 A | | 9/1993 | Guaraldi et al. |
| 5,514,197 A | * | 5/1996 | Den .................................. 55/405 |
| 5,595,238 A | * | 1/1997 | Mark et al. ......................... 165/9 |
| 5,813,073 A | | 9/1998 | Korbonski |
| 6,004,384 A | * | 12/1999 | Caudle ............................. 96/125 |
| 6,205,644 B1 | * | 3/2001 | Daniels et al. .................. 29/596 |
| 6,279,309 B1 | | 8/2001 | Lawlor et al. |
| 6,289,974 B1 | * | 9/2001 | DeGregoria et al. ............. 165/8 |
| 6,361,585 B1 | * | 3/2002 | Anzai et al. ..................... 95/113 |
| 6,527,837 B2 | * | 3/2003 | Kurosawa et al. .............. 96/125 |

(Continued)

FOREIGN PATENT DOCUMENTS

| | | |
|---|---|---|
| DE | 12 04 466 B | 12/1960 |
| JP | A-2009-269716 | 11/2009 |

OTHER PUBLICATIONS

European Search Report issued in European Application No. 11165165.9 dated Feb. 21, 2012.

(Continued)

*Primary Examiner* — Terrell McKinnon
*Assistant Examiner* — Daniel J Breslin
(74) *Attorney, Agent, or Firm* — Oliff PLC (57) ABSTRACT

A system and method for easing the installation and removal of a desiccant rotor from an air handling system. The system and method enabling the installation of a shaft through the center of a rotor, the shaft having a first end portion protruding from the first axial face and a second end portion protruding from the second axial face, supporting the shaft and the rotor with a first support rail and a second support rail, the first and second support rails being positioned on opposite axial sides of the rotor and extending radially outward from a radial center of the rotor in an installed position, placing at least one keeper mechanism on each of the first and second support rails to secure the rotor in the installed position, and removing the at least one keeper mechanism to allow translational movement of the rotor along the first and second support rails.

19 Claims, 7 Drawing Sheets

(56) References Cited

U.S. PATENT DOCUMENTS

| | | |
|---|---|---|
| 6,629,815 B2 | 10/2003 | Lusk |
| 6,852,141 B2 * | 2/2005 | Bishop et al. ............... 55/385.3 |
| 7,077,627 B2 * | 7/2006 | Kupferberg ................. 415/201 |
| 7,392,701 B2 * | 7/2008 | Turner et al. ................ 73/462 |
| 7,569,101 B2 * | 8/2009 | Hung ........................ 96/125 |
| 7,856,840 B2 * | 12/2010 | Yoon et al. ................. 62/285 |
| 7,887,042 B2 * | 2/2011 | Sheng et al. ............... 271/121 |
| 2006/0034681 A1 | 2/2006 | Kupferberg |
| 2006/0278084 A1 * | 12/2006 | Kim ........................... 96/140 |
| 2007/0295215 A1 * | 12/2007 | Hung ......................... 96/151 |
| 2010/0154201 A1 | 6/2010 | Pervaiz |
| 2011/0197770 A1 * | 8/2011 | Yun et al. ................... 96/407 |

OTHER PUBLICATIONS

Nu-Con, Special Components, http://www.nucon.com/en/components/special-components/.

* cited by examiner

ROTOR SUPPORT SYSTEM

BACKGROUND

This disclosure relates to an improved rotor support system for supporting desiccant rotors that are installed in air handling systems.

Figure 7:
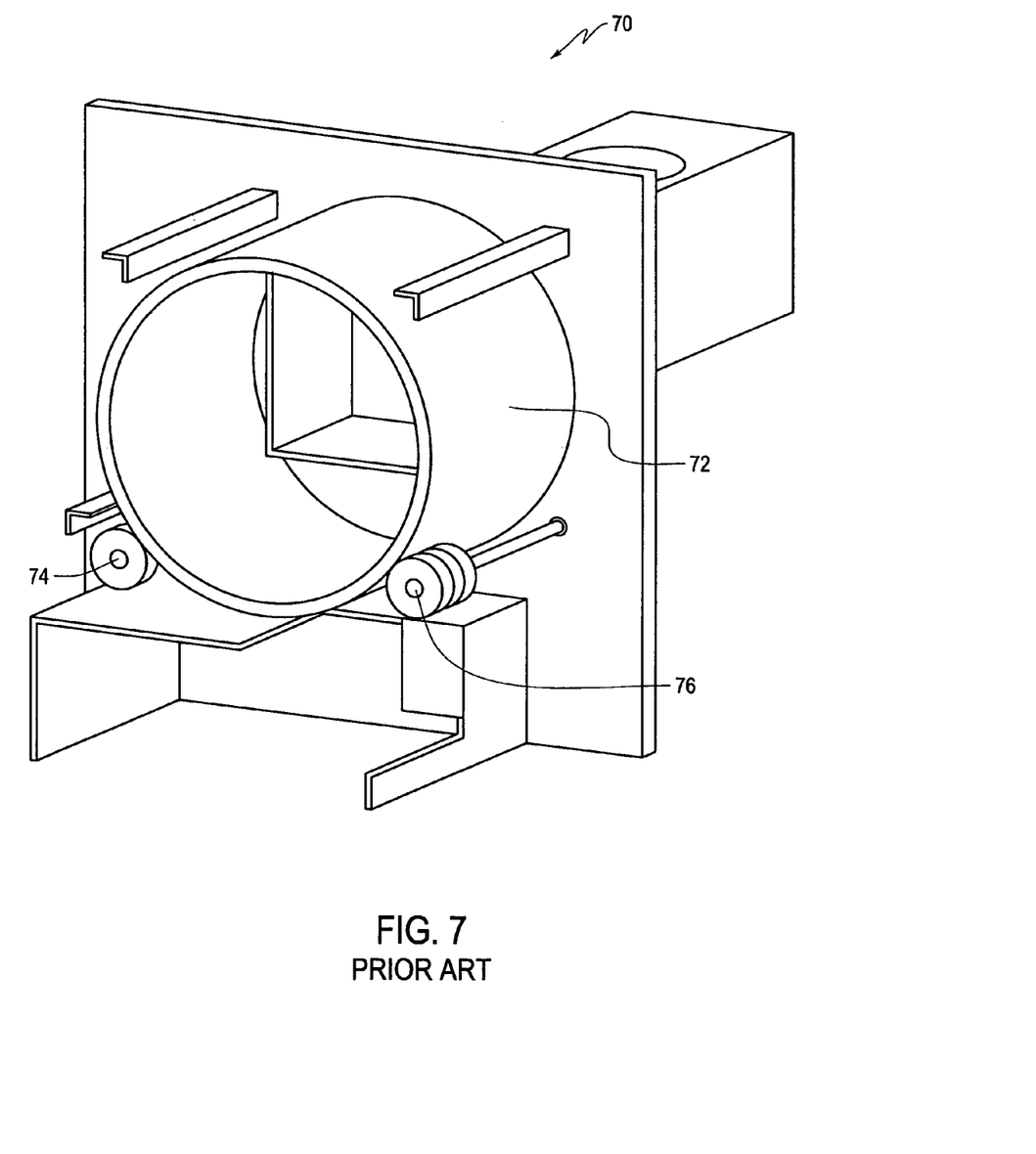
FIG. 7 illustrates a conventional installation of a desiccant rotor.

Many air handling systems include desiccant rotors of varying sizes. These air handling systems often require that the desiccant rotors be periodically removed from their housings for service or replacement. Conventionally, medium to large desiccant rotors are installed in the manner shown generally in FIG. 7. FIG. 7 illustrates a conventionally-mounted desiccant rotor system 70, with the external housing removed. A body 72 for housing a desiccant rotor is supported on two shafts with roller wheels 74, 76 positioned beneath the desiccant rotor housing 72 to support and rotate the desiccant rotor housing 72. A motor (not shown), and belt that surrounds the desiccant rotor (not shown), rotate the desiccant rotor. To remove the desiccant rotor housing 72 that is installed according to the conventional method, the desiccant rotor housing 72 must be lifted with a strap, one of the shafts with the roller wheels 74, 76 is removed, and the desiccant rotor housing 72 is lowered onto a ramp (not shown). These steps enable the desiccant rotor housing 72 to be rolled out of the air handling system 70.

An alternative to the above conventional installation of a medium to large desiccant rotor is using a method such that the rotor is "center-hung." A center-hung rotor includes a shaft that is inserted through a bearing in the center of the rotor. The shaft extends in a direction that is normal to the first and second axial faces of the rotor.

When installed, the shaft typically extends through a supporting sheet metal structure to hold the shaft and the rotor in its installed position. The shaft may be held in place, for example, with a shoulder bolt in each end of the shaft. The drive system for rotating such a desiccant rotor may include a belt that surrounds the desiccant rotor and is driven by a motor.

A difficulty with a center-hung installation is that it is difficult to remove such center-hung desiccant rotors once installed. In order to remove a center-hung desiccant rotor, access is generally required to both ends of the shaft. However, air handling systems that require this type of access specifically require an increase in the size of the air handling system and/or the area that accommodates the air handling system.

SUMMARY

It would be advantageous to provide a system and method by which the installation and removal of a center-hung desiccant rotor could be achieved without requiring access to both ends of the shaft.

It would be advantageous to provide a center-hung desiccant rotor support system that uses a center shaft that is inserted through a bearing in the center of the desiccant rotor. The desiccant rotor has a first axial face and a second axial face. The desiccant rotor is supported by the center shaft such that shaft protrudes from both the first axial face and second axial face of the desiccant rotor. The support system may be configured such that the center shaft is in contact with, or is supported by, a first support rail and a second support rail. The first and second support rails of the support system may be positioned on opposite axial sides of the rotor and may extend radially outward from a radial center of the rotor when the desiccant rotor is in an installed position. The desiccant rotor support system may include at least one keeper mechanism mounted on at least one of the first and second support rails to secure the desiccant rotor in the installed position. The keeper mechanism may be removable to allow translational movement of the desiccant rotor along the first and second support rails from the installed position to a removed and/or maintenance position.

In various exemplary embodiments, the rotor support system may have a shaft with a groove positioned at least at one end of the shaft. The groove being around an entire circumference of the shaft. The groove may be configured to engage at least one of the first and second support rails so that the desiccant rotor and shaft may roll along the first and second support rails. The groove may also be recessed from an axial end of the shaft. Alternatively, the shaft may have a connector to which an engager that engages at least one of the first and second support rails is attached. The engager may have raised or recessed portions that hold the shaft on at least one of the first and second support rails.

In various exemplary embodiments, at least one of the first and second support rails may have a shaft seat in which the shaft may sit in the installed position. The system according to this disclosure may also incorporate a lift device that is configured to unseat the shaft from the shaft seat. The lift device may be a lever or other mechanical lifting means.

In various exemplary embodiments, the shaft may be installed into a roller device that is configured to ride along at least one of the first and second support rails. The roller device may be configured to hold the shaft above, below or at the same level as at least one of the first and second support rails.

In various exemplary embodiments, the rotor support system may use a motor drive belt that is positioned to at least partially engage a circumferential face of the desiccant rotor. The belt may be used to facilitate the translational movement of the desiccant rotor along the first and second support rails. The rotor support system according to this disclosure may alternatively, or further have, a removal mechanism that is driven by a motor to facilitate translational movement of the rotor along the first and second support rails.

In various exemplary embodiments, the first and second support rails may be level, or deviate from being level, to facilitate translational movement of the desiccant rotor. The support rails may also be adjustable to ease installation and removal of the desiccant rotor.

In various exemplary embodiments, the first and second support rails may incorporate at least one safety measure that may be engaged such as a removable pin, or a slot that prevents translational movement of the rotor along the first and second support rails without a guide. In the case of the slot, a removable guide may be installed to allow translational movement of the shaft along the first and second support rails. The guide may be a separate unit from the rotor support system or it may be incorporated into the rotor support system, as an integral component. For instance, the guide may be the keeper mechanism. In this case, the keeper mechanism may be removed from a position that holds the shaft in the installed position, and then used as the guide to allow translational movement of the desiccant rotor along the first and second support rails.

These and other features and advantages of the disclosed system and method are described in, or apparent from, the following detailed description of various exemplary embodiments.

BRIEF DESCRIPTION OF THE DRAWINGS

Various exemplary embodiments of the disclosed rotor support system will be described, in detail, with reference to the following drawings wherein.

DETAILED DESCRIPTION OF EMBODIMENTS

The following embodiments illustrate examples of a rotor support system and method that enable a desiccant rotor to be installed and removed from a side of an air handling system that faces a circumferential surface of the desiccant rotor without requiring access to both ends of a support shaft for the desiccant rotor to facilitate its removal from the air handling system in which the desiccant rotor is installed.

Figure 1:
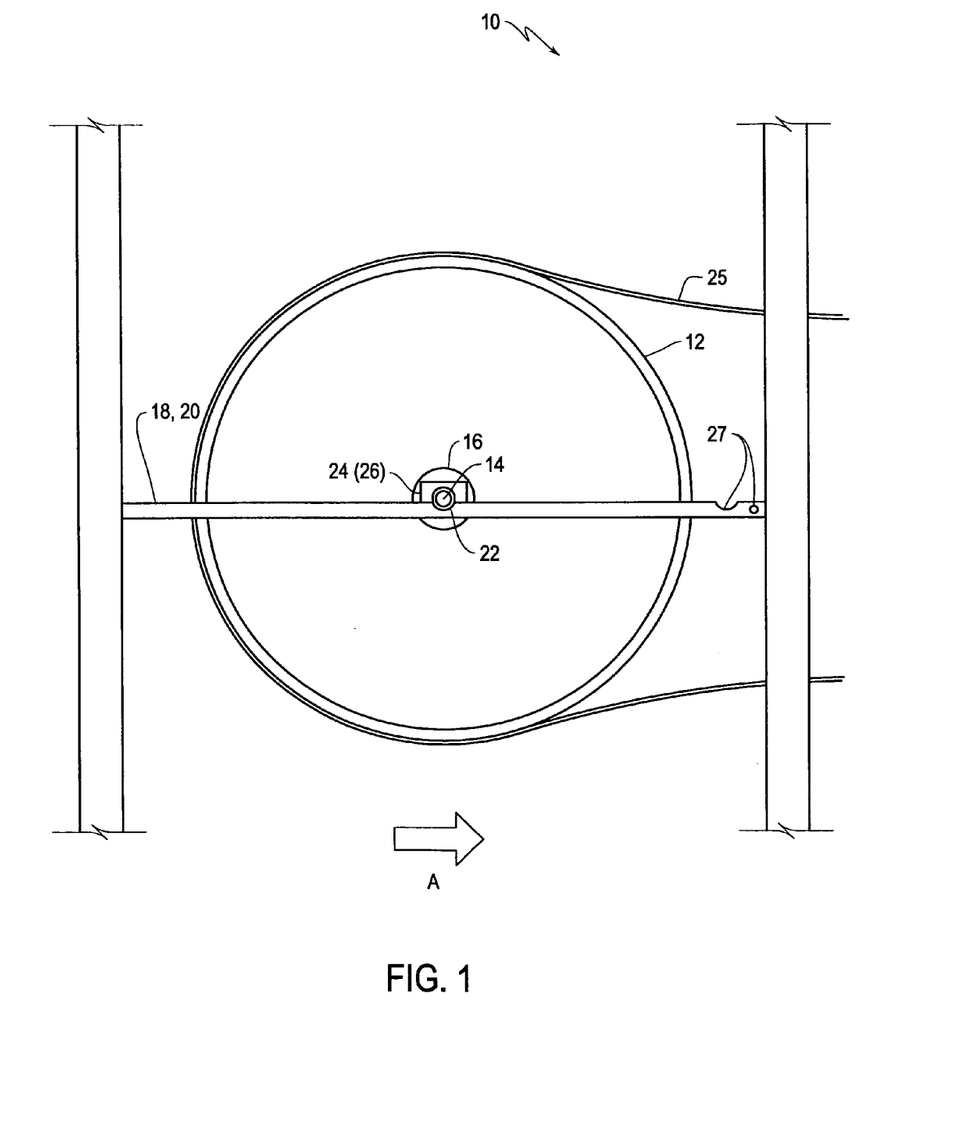
FIG. 1 illustrates a front-side view of a first embodiment of a rotor support system according to this disclosure.

FIG. 1 illustrates a rotor support system 10 that supports a desiccant rotor 12. FIG. 1 illustrates a rotor support system with the surrounding cabinet removed. It should be noted that the desiccant rotor support system 10 will be mounted in support of an air handling system typically inside an overall enclosure, which is not shown in FIG. 1. An objective of the disclosed embodiments, as mentioned briefly above, is to minimize the overall size of the air handling system, and particularly the enclosure within which the rotor support system 10 may be accommodated. In the rotor support system shown in FIG. 1, the desiccant rotor 12 is a center-hung rotor. The desiccant rotor 12 is supported by a center shaft 14 that is inserted through a bearing 16 that is positioned substantially on a central axis of the desiccant rotor 12. The center shaft 14 that supports the desiccant rotor 12 extends in a direction outwardly from first and second axial faces of the desiccant rotor 12. The center shaft 14 is supported at a first end by a first support rail 18 on one side of the desiccant rotor 12 and at a second end by a second support rail 20 on the other side of the desiccant rotor 12. The first and second support rails 18, 20 may be installed in a substantially level attitude, be installed to deviate slightly from level, and may be fixed or adjustable at one or both ends in a vertical direction. The center shaft 14 may rest in an installed position in a shaft seat 22. The center shaft 14 may be held in the installed position by a keeper mechanism 24. The keeper mechanism 24 may be removable to allow for translational movement of the desiccant rotor 12 along the first and second support rails 18, 20 along a radial direction from the desiccant rotor 12 when the desiccant rotor 12 is to be moved from the installed position. The translational movement of the desiccant rotor 12 may be facilitated by a belt 25, which may be a drive belt that engages the desiccant rotor 12, or another belt that is used to move the desiccant rotor 12 along the first and second support rails 18, 20.

The movement of the desiccant rotor 12 in a Direction A depicted in FIG. 1 facilitates removal of the desiccant rotor 12 from a side of the rotor support system 10, which is incorporated into an air handling system without requiring access to both ends of the center shaft 14 from an axial direction of the center shaft 14. The first and second support rails 18, 20 may also have a safety mechanism 27 that prevents movement of the desiccant rotor 12 from the support system 10. The safety mechanism 27 may be a slot in at least one of the first and second support rails 18, 20 that will only allow the rotor to be installed or removed from the system 10 with the use of a removable guide 26. The safety mechanism 27 may also be a pin that prevents movement of the desiccant rotor 12 when the pin is in an installed position.

Figure 2:
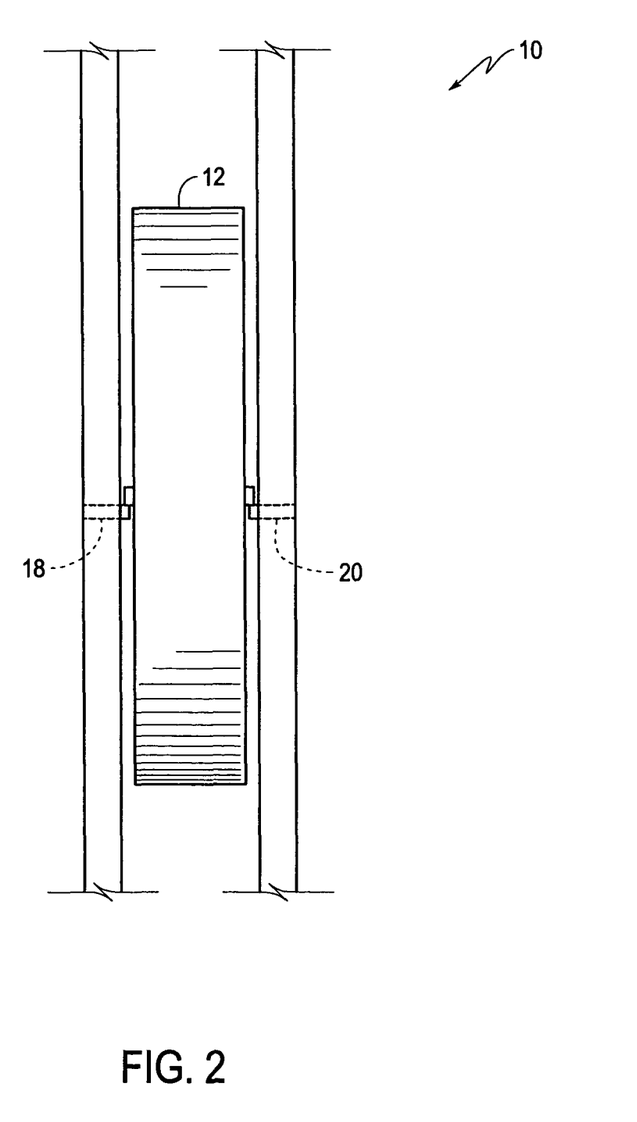
FIG. 2 illustrates a side view of the first embodiment of the rotor support system according to this disclosure.
Figure 3A:
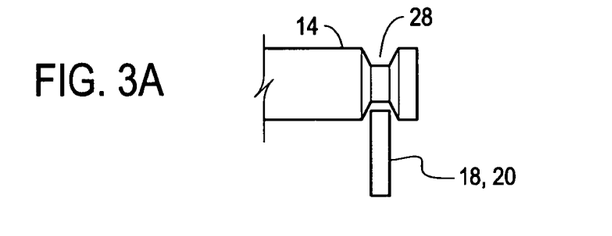
FIGS. 3A-3E illustrate exemplary shaft configurations of embodiments of the rotor support system according to this disclosure.
Figure 3B:
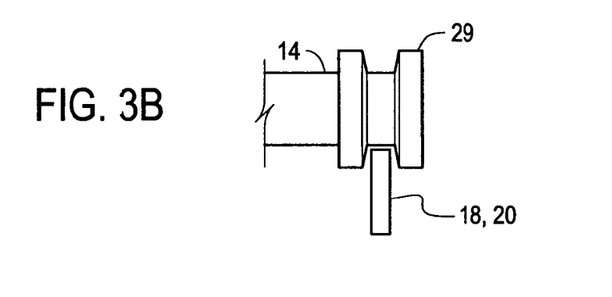
Figure 3C:
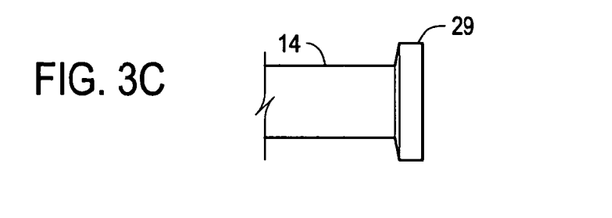
Figure 3D:
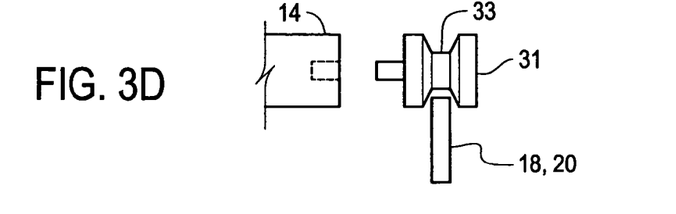
Figure 3E:
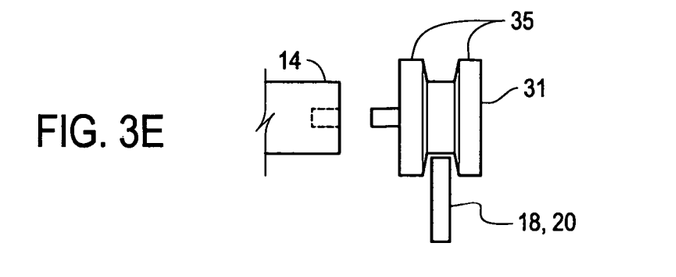

FIG. 2 illustrates a side view of the rotor support system 10 that faces a circumferential surface of the desiccant rotor 12. The desiccant rotor 12 may be installed and removed along the support rails 18, 20 in a radial direction of the desiccant rotor 12. With an access panel (not shown) of the air handling system/desiccant rotor enclosure removed, and the desiccant rotor engaged with, for example, a belt 25 (as shown in FIG. 1) removal of the desiccant rotor 12 from the air handling system may be facilitated by pulling the desiccant rotor 12 along support rails 18, 20.

FIG. 3A-3E illustrate exemplary configurations of ends of center shaft 14. The center shaft 14 may have a circumferential groove 28 on at least one end of the shaft 14. The circumferential groove 28 may engage at least one of the first and second support rails 18, 20 so that the center shaft 14 may roll along the first and second support rails 18, 20. The center shaft 14 may alternatively have an engager 31 that is attached to the shaft that has a groove 33, or at least one raised portion 35 that is integrated with, or attached to, at least one end of the center shaft 14 such that the raised portion engages at least one of the first and second support rails 18, 20. Engagement by a circumferential groove 28, an engager 31, or a raised portion 29 at one or both of the ends of the center shaft 14 with one or both support rails 18, 20 will serve to prevent the desiccant rotor from becoming displaced axially in the direction of the center shaft 14 from one or both of the support rails 18, 20 when in the installed position, or when being translated radially along the support rails.

Figure 4:
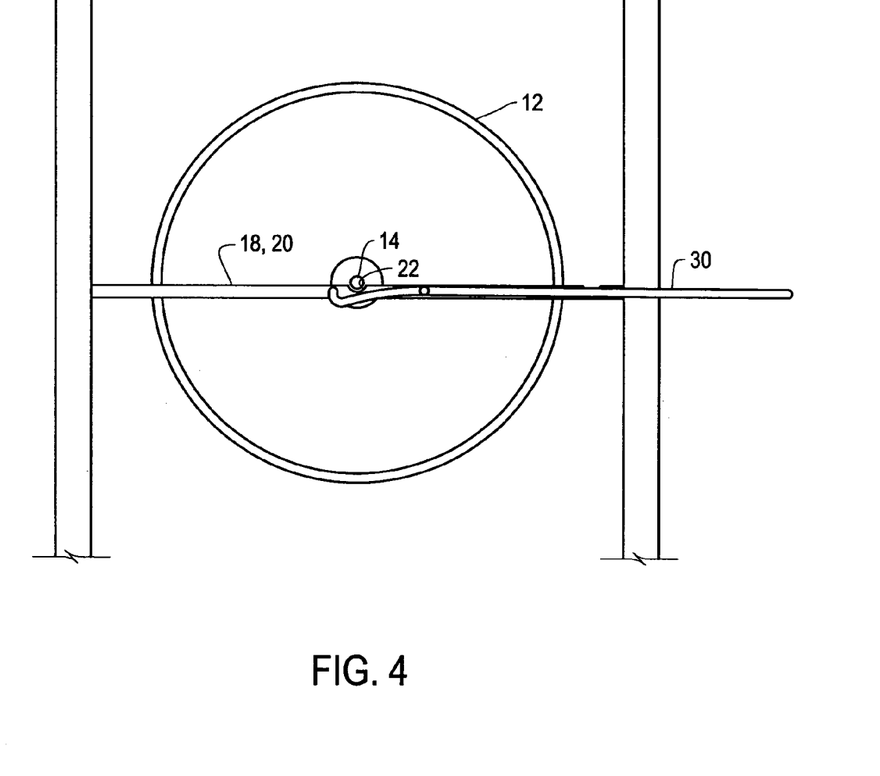
FIG. 4 illustrates a front-side view of a second embodiment of a rotor support system having a lift mechanism according to this disclosure.

FIG. 4 illustrates an exemplary embodiment of a lift mechanism 30 that may be used to lift the center shaft 14 from the shaft seat 22 in which the center shaft 14 sits in the installed position. The lift mechanism 30 may be of a manual lever type, or another mechanically driven means, to unseat the center shaft 14 from the shaft seat 22 in which the center shaft 14 sits in the installed position.

Figure 5:
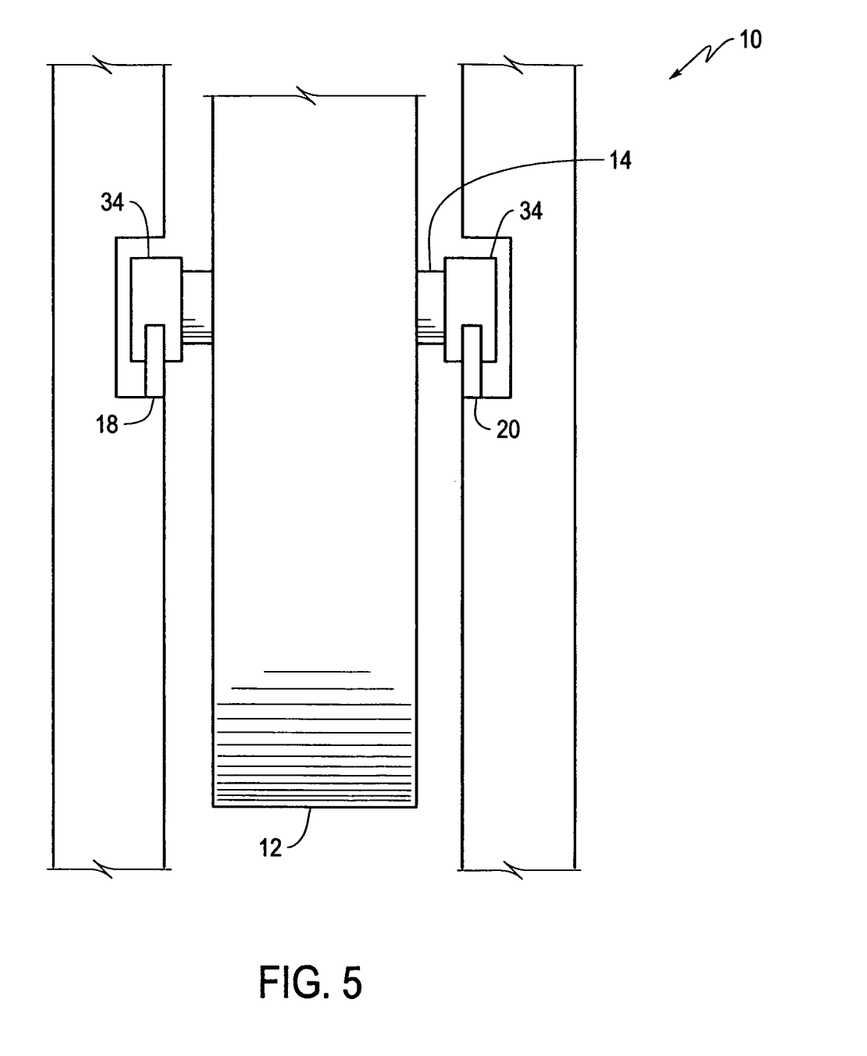
FIG. 5 illustrates a side view of a rotor support system having carriages for facilitating movement of the rotor along support rails according to this disclosure.

FIG. 5 illustrates a carriage 34 in which the center shaft 14 may be installed. The carriage 34 may ride along at least one of the first and second support rails 18, 20. The carriage 34 may hold the center shaft 14 above, below, or at the same level as the first and second support rails 18, 20. The carriage 34 may move manually along the first and second support rails 18, 20, or it may be driven by a motor. The carriage 34 may itself lock into the installed position, or the carriage 34 may dump the center shaft 14 into the installed position. If the center shaft 14 is dumped into the installed position, then the lift mechanism 30 may be used to load the shaft into the carriage 34 for removal from the rotor support system 10.

Figure 6:
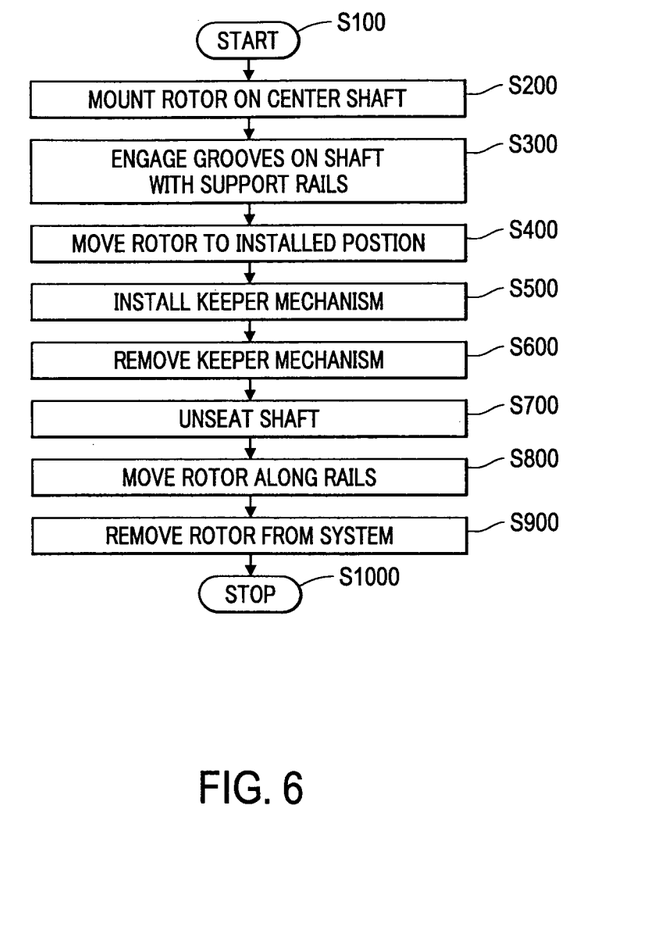
FIG. 6 illustrates a flowchart of a process for installing and removing a rotor into and out of a rotor support system according to this disclosure.

FIG. 6 illustrates a flowchart of an exemplary embodiment of a method for installing and removing a desiccant rotor 12 from a rotor support system 10. As shown in FIG. 6, operation of the method commences at step S100 and proceeds to step S200.

In step S200, the desiccant rotor 12 is mounted onto the center shaft 14 by inserting the center shaft 14 through the desiccant rotor 12. Operation of the method proceeds to step S300.

In step S300, the center shaft 14 is aligned with and mounted on the first and second support rails 18, 20 such that the circumferential groove 28, or other engaging mechanism, engages the first and second support rails 18, 20. Operation of the method proceeds to step S400.

In step S400, the desiccant rotor 12 is moved into an installed position in the shaft seat 22 by being translated radially along the support rails 18, 20. Operation of the method proceeds to step S500.

In step S500, the keeper mechanism 24 is installed to keep the desiccant rotor 12 in the installed position and prevent translational movement along the first and second support rails 18, 20 while the desiccant rotor 12 is in operation. Operation of the method may proceed to step S600 at an appropriate time.

In step S600, the keeper mechanism 24 is removed to allow translational movement of the desiccant rotor 12 along the first and second support rails 18, 20 in a radial direction out of the desiccant rotor 12 out of the installed position. Operation of the method proceeds to step S700.

In step S700 the lift mechanism 30 may be used to unseat the center shaft 14 from the shaft seat 22. Operation of the method proceeds to step S800.

In step S800, the desiccant rotor 12 is moved along the support rails 18, 20 with a belt 25, or other mechanism, so that the desiccant rotor 12 may be removed from the support system 10. Operation of the method proceeds to step S900.

In step S900, the desiccant rotor 12 is removed from the rotor support system 10 for maintenance or replacement. Operation of the method proceeds to step S1000 where operation of the method ceases, or proceeds back to step S100 for reinstallation.

It will be appreciated that various of the above-disclosed and other features and functions, or alternatives thereof, may be desirably combined into different systems or applications. Also, various presently unforeseen or unanticipated alternatives, modifications, variations or improvements therein may be subsequently made by those skilled in the art which are also intended to be encompassed by the following claims.

What is claimed is:

1. A rotor support system, comprising:
   a rotor having a first axial face on one side and a second axial face on an opposite side, and a circumferential face on an outer periphery of the rotor;
   a shaft through the center of the rotor, the shaft having a first end portion protruding from the first axial face and a second end portion protruding from the second axial face; and
   a first support rail and a second support rail, the first and second support rails being positioned on opposite axial sides of the rotor and extending radially outward from a radial center of the rotor in an installed position, each of the first and second support rails including at least one keeper mechanism mounted on at least one of the first and second support rails configured to secure the rotor in the installed position, wherein:
   the at least one keeper mechanism is removable to allow translational movement of the rotor along the first and second support rails;
   at least one of the first end portion and the second end portion include an engaging groove around an entire circumference of the shaft, the engaging groove being axially recessed from a respective end of the shaft; and
   the at least one engaging groove in at least one of the first and second end portions of the shaft engages a respective first and second support rail.

2. The rotor support system of claim 1, wherein the first and second support rails have a shaft seat configured to allow the shaft to sit in the installed position.

3. The rotor support system of claim 2, further comprising a lift device configured to unseat the shaft from the shaft seat.

4. The rotor support system of claim 1, further comprising at least one roller device that is configured to hold at least one of the first end and the second end of the shaft and engages a respective at least one of the first support rail and the second support rail.

5. The rotor support system of claim 4, wherein the roller device is a cantilevered roller device that is configured to support at least one of the first end and the second end of the shaft below the at least one of the first support rail and the second support rail.

6. The rotor support system of claim 4, wherein the roller device is a cantilevered roller device that is configured to support at least one of the first end and the second end of the shaft at the same level as the at least one of the first support rail and the second support rail.

7. The rotor support system of claim 1, further comprising a belt that is positioned to at least partially engage the circumferential face of the rotor to facilitate the translational movement of the rotor along the first and second support rails.

8. The rotor system of claim 1, further comprising a removal mechanism driven by a motor configured to push and pull the rotor along the first and second support rails.

9. The rotor support system of claim 1, wherein the first and second support rails are level.

10. The rotor support system of claim 1, wherein the first and second support rails deviate from being level.

11. The rotor support system of claim 1, wherein access to the system is provided at a position facing the circumferential face of the rotor, while access is restricted along the first and second axial faces of the rotor.

12. The rotor support system of claim 1, wherein the at least one of the first and second support rails have at least one slot configured to prevent translational movement of the rotor along the first and second support rails.

13. The rotor support system of claim 12, wherein a removable guide is placed in the at least one slot to allow translational movement of the rotor along the first and second support rails.

14. The rotor support system of claim 13, wherein the keeper mechanism is configured to be used as the removable guide.

15. A method for supporting and removing a rotor comprising:
   installing a shaft through the center of a rotor, the rotor having a first axial face on one side and a second axial face on an opposite side, and a circumferential face on an outer periphery of the rotor, and the shaft having a first end portion protruding from the first axial face and a second end portion protruding from the second axial face;
   supporting the shaft and the rotor with a first support rail and a second support rail, the first and second support rails being positioned on opposite axial sides of the rotor and extending radially outward from a radial center of the rotor in an installed position;
   placing at least one keeper mechanism on each of the first and second support rails to secure the rotor in the installed position; and
   removing the at least one keeper mechanism to allow translational movement of the rotor along the first and second support rails, wherein:

at least one of the first end portion and the second end portion include an engaging groove around an entire circumference of the shaft, the engaging groove being axially recessed from a respective end of the shaft; and the at least one engaging groove in at least one of the first and second end portions of the shaft engages a respective first and second support rail.

16. The method according to claim 15, wherein the rotor is moved along the first and second support rails with a belt.

17. The method according to claim 15 further comprising:

resting the shaft in a shaft seat on the first and second support rails to allow the shaft to sit in the installed position; and lifting the shaft with a lift device to unseat the shaft from the shaft seat.

18. A rotor support system, comprising:

a rotor having a first axial face on one side and a second axial face on an opposite side, and a circumferential face on an outer periphery of the rotor;

a shaft through the center of the rotor, the shaft having a first end portion protruding from the first axial face and a second end portion protruding from the second axial face; and a first support rail and a second support rail, the first and second support rails being positioned on opposite axial sides of the rotor and extending radially outward from a radial center of the rotor in an installed position, each of the first and second support rails including at least one keeper mechanism mounted on at least one of the first and second support rails configured to secure the rotor in the installed position, wherein:

the at least one keeper mechanism is removable to allow translational movement of the rotor along the first and second support rails;

the at least one of the first and second support rails have at least one slot configured to prevent translational movement of the rotor along the first and second support rails; and a removable guide is placed in the at least one slot to allow translational movement of the rotor along the first and second support rails.

19. The rotor support system of claim 18, wherein the keeper mechanism is configured to be used as the removable guide.

* * * * *